3,150,990
OPTICAL GLASS

Marga Faulstich, Mainz, Germany, assignor to Jenaer Glaswerk Schott & Gen., Mainz, Germany, a German corporation
No Drawing. Filed Aug. 13, 1962, Ser. No. 216,297
Claims priority, application Germany Apr. 4, 1960
4 Claims. (Cl. 106—47)

The present invention relates to an optical glass which has a high content in $La_2O_3$, $ThO_2$, and $Ta_2O_5$ and is a continuation-in-part of my co-pending application Serial No. 99,687, filed March 31, 1961, and now abandoned.

Glass compositions of this type have often been produced for the purpose of attaining a high refractive index and a low dispersion, and the compositions as disclosed, for example, in the United States Patents Re. 21,175 and 2,206,081, already possessed quite favorable optical properties. However, the highest refractive index $n_d$ which could be attained with these known compositions amounted only to 1.898. Although the three glass compositions F, C, and A, as mentioned in the United States Patent Re. 21,175, which are especially characterized by their high content in titanic oxide, have a higher refractive index, it was found by tests that these compositions are unstable and that they have a relatively high dispersion and a yellow-brown color.

According to the present invention, it has now been found that it is possible to produce a stable, relatively colorless glass with a high content in $La_2O_3$, $ThO_2$, and $Ta_2O_5$, and with a refractive index exceeding 2.00 if this glass contains at least 6% by weight of $$Nb_2O_5+WO_3+PbO$$

in which at least 2% by weight consist of $Nb_2O_5$. If the content in $Nb_2O_5$ exceeds 6% by weight, the glass attained will be found to have an excellent stability.

The composition of the glass according to the present invention may be as follows:

| | Percent by weight |
|---|---|
| $B_2O_3$ | 10–20 |
| $La_2O_3$ | 11–35 |
| $ThO_2$ | 15–50 |
| $Ta_2O_5$ | 5–25 |
| $Nb_2O_5$ | 2–27 |
| $WO_3$ | 0–8 |
| PbO | 0–10 |

The properties of a glass of this composition will not be impaired if CdO and titanic oxide are added in amounts of up to 5%.

The $\nu$-value of this glass may be reduced without impairing the color by introducing up to 15% by weight of $Al_2O_3$ while reducing the boric acid content accordingly. The content in $B_2O_3$ should then, however, amount to not less than 13% by weight.

Insofar as borate glass compositions are concerned, the new glass compositions possess an exceptionally high chemical stability and an excellent mechanical hardness. It has been found that it is not possible to replace the thorium oxide entirely or even partly by lanthanum oxide or tantalum oxide since even small batches of the melted glass will crystallize very quickly and the production of large batches will thus be impossible.

Although it is very well possible to increase the content in tungsten oxide considerably, the glass then attained will have the disadvantage that it has a stronger yellow tint and may therefore not be used for many purposes.

In place of lanthanum oxide, small amounts of oxide of an alkaline earth metal, namely, up to 5% by weight, may be added.

The glass in accordance with the invention is produced in the conventional and well-known manner and the skilled artisan need only be advised of the oxide content of the glass in order to produce the same.

Thus, raw materials, which, of course, should be as pure as possible, are thoroughly mixed together in the conventional manner in the amounts necessary and well known in the art to produce the desired oxide content in the glass. The mixture is then melted in a platinum crucible at a temperature of about 1350 to 1400 degrees C. After the melting, the melt is subjected to the conventional refining or fining operation in order to remove gases from the melt. This refining process is carried out, for example, at a temperature which is 50 degrees higher than the melting temperature. After the refining, the clarified melt is homogenized by stirring while allowing the same to slowly cool. The melt is then allowed to stand without stirring and to further cool, and then is poured into molds preheated to about 300° C., for example. The filled molds are then allowed to further cool, as for example, in a cooling oven where the melt cools and solidifies down to room temperature, as for example at a rate of 10 degrees per hour. The initial cooling temperature may, for example, amount to about 640 degrees C.

The main purpose of the pre-cooling is to prevent the glass from cracking as it cools or from shattering when the cooled glass is being cut or ground. After the cooling is complete, pieces of glass are taken from the cooling oven and may be put in the form required for further processing, as for example by sawing, breaking, grinding, etc. Furthermore, the pieces may be tested for their properties, such as index of refraction, and for defects, such as bubbles and striae. The glass, which is so obtained is referred to in the art as "optical raw glass." This glass has particular properties of refraction and dispersion which are of particular importance for optical purposes, but it is not necessary for the glass to have been subjected to a special fine cooling process or annealing process or that the same be available in large completely uniform pieces. Requirements as to homogeneity in an optical glass depend to a great extent on its intended use and for example the glass may be outstandingly well suited for a microscope lens and be completely unuseable for large lenses due to lack of homogeneity. The instant invention is solely directed to the production of the optical raw glass, and this end product as obtained in accordance with the invention may be further treated by the manufacturer of lenses, as for example by tempering, hot pressing, or the like. It is also possible to produce the glass so that the pre-cooling is effected as a fine cooling process or to produce the glass in a continuous melting furnace or to press the glass into a mold while still in the molten state or the like.

The following examples illustrate the production of the novel optical raw glass in accordance with the invention in this conventional manner:

EXAMPLE 1

In order to produce an optical raw glass of the following composition in accordance with the invention:

| Oxides: | Weight percentage |
|---|---|
| $B_2O_3$ | 13.0 |
| $La_2O_3$ | 30.0 |
| $ThO_2$ | 25.0 |
| $Ta_2O_5$ | 24.0 |
| $Nb_2O_5$ | 8.0 |

The following amounts of raw material which are preferably in their purest iron-free form are mixed together for 7 minutes in a small mixer.

| | Kg. |
|---|---|
| Boric acid, $H_3BO_3$ | 0.577 |
| Lanthanum oxide, $La_2O_3$ | 0.754 |
| Thorium nitrate, $Th(NO_3)_4$ | 1.269 |
| Tantalum oxide, $Ta_2O_5$ | 0.602 |
| Niobium oxide, $Nb_2O_5$ | 0.200 |
| Arsenic oxide, $As_2O_3$ (as a clarifier) | 0.075 |

The cationic oxide content of each raw material is determined analytically before the material is added, and the amount of material used is based on this oxide content to give the ultimate desired oxide percentage as indicated above. The well-mixed batch is placed in a platinum crucible for about 1 hour and melted at a temperature of 1360° C. and then clarified for 30 minutes at 1400° C. The melt is then homogenized by immersing an agitator in the melt and rotating it at about 100 r.p.m. for 45 minutes while allowing the melt to cool from 1400° C. down to 1120° C. During the agitation, it is preferable to cover the crucible with a thermally insulating lid. The melt is then allowed to stand without stirring until it reaches a temperature of about 1100° C., and then is poured into molds preheated to about 300° C. The filled mold is placed into a cooling oven where the melt is allowed to cool from a temperature of 693° C. down to room temperature at a rate of 10 degrees per hour. The cooled glass obtained from the mold may be removed by breaking and sawing and is suitable for the manufacture of lenses of up to 35 mm. diameter. The glass obtained has the following properties:

Optical refraction:
$n_d$ ---- 1.9604
$v_d$ ---- 34.97
Specific gravity ---- 6.07
Coefficient of expansion, $.10^7$ ---- 74
Annealing point, $T_g$ ---- ° C ---- 693

EXAMPLE 2

Example 1 is repeated except the glass composition and the components used to form the melt are indicated in the following table:

| Oxides | Weight percentage | Weigh-in as— | Weigh-in weight in kg. |
|---|---|---|---|
| $B_2O_3$ | 11.2 | $H_3BO_3$ | 0.497 |
| $La_2O_3$ | 12.2 | $La_2O_3$ | 0.307 |
| $ThO_2$ | 45.0 | $Th(NO_3)_4$ | 2.335 |
| $Ta_2O_5$ | 20.4 | $Ta_2O_5$ | 0.512 |
| $Nb_2O_5$ | 10.2 | $Nb_2O_5$ | 0.255 |
| | | $As_2O_3$ | [1] 0.075 |

[1] As a clarifier.

Furthermore, the melt is cooled down from 701° C. rather than 693° C. The glass obtained has the following properties:

Optical refraction:
$n_d$ ---- 2.0030
$v_d$ ---- 32.98
Specific gravity ---- 6.64
Coefficient of expansion .10 ---- 69
Annealing point, $T_g$ ---- ° C ---- 701

The following tables contain examples of different compositions of the optical glass according to the invention.

The compositions listed in Table I have refractive indexes up to 1.9620. It has further been found that a still higher refractive index may be attained if the glass is composed as follows:

| | Percent by weight |
|---|---|
| $B_2O_3$ | 10–15 |
| $La_2O_3$ | 11–29 |
| $ThO_2$ | 24–50 |
| $Ta_2O_5$ | 15–25 |
| $Nb_2O_5$ | 9–13 |

The content in lanthanum oxide and thorium oxide preferably amounts to 47 to 62% by weight.

The compositions listed in Table II result in an optical glass with a refractive index of >1.9620.

*Table I*

| No. | $B_2O_3$ | $La_2O_3$ | $ThO_2$ | $Ta_2O_5$ | $Nb_2O_5$ | PbO | CdO | $TiO_2$ | $WO_3$ | $Al_2O_3$ | $n_d$ | d |
|---|---|---|---|---|---|---|---|---|---|---|---|---|
| 4599 | 17 | 27 | 25 | 23 | 2 | 6 | | | | | 1.9000 | 37.8 |
| 3911 | 20 | 30 | 16 | 5 | 27 | | | | | 2 | 1.9046 | 31.9 |
| 4437 | 13 | 23 | 26 | 23 | 8 | | | | | 7 | 1.9087 | 36.42 |
| 4603 | 20 | 30 | 18 | 5 | 20 | | | | 7 | | 1.9145 | 32.5 |
| 3076 | 17 | 33 | 20 | 24 | 6 | | | | | | 1.9157 | 37.0 |
| 3317 | 20 | 30 | 18 | 10 | 22 | | | | | | 1.9164 | 32.6 |
| 4153 | 17 | 27 | 25 | 23 | 8 | | | | | | 1.9218 | 30.4 |
| 3326 | 20 | 30 | 18 | 5 | 27 | | | | | | 1.9229 | 32.0 |
| 4604 | 20 | 30 | 18 | 10 | 16 | | 6 | | | | 1.9302 | 31.6 |
| 3094 | 17 | 33 | 18 | 17 | 15 | | | | | | 1.9330 | 33.8 |
| 4602 | 13 | 32 | 23 | 24 | 6 | | | | | 2 | 1.9381 | 35.9 |
| 4601 | 13 | 32 | 23 | 24 | 6 | 2 | | | | | 1.9391 | 35.8 |
| 4431 | 17 | 12 | 37 | 19 | 15 | | | | | | 1.9424 | 32.4 |
| 4447 | 13 | 33 | 27 | 19 | 8 | | | | | | 1.9591 | 36.1 |
| 4445 | 13 | 31 | 27 | 21 | 8 | | | | | | 1.9595 | 34.8 |
| 4452 | 13 | 32 | 23 | 24 | 8 | | | | | | 1.9620 | 35.0 |

*Table II*

| | 1 | 2 | 3 | 4 | 5 | 6 | 7 | 8 |
|---|---|---|---|---|---|---|---|---|
| $B_2O_3$ | 13 | 13 | 13 | 13 | 13 | 13 | 11.2 | 10 |
| $La_2O_3$ | 23 | 11 | 22 | 20 | 17 | 15 | 12.2 | 12 |
| $ThO_2$ | 32 | 50 | 33 | 32 | 41 | 46 | 46.0 | 45 |
| $Ta_2O_5$ | 23 | 16 | 22 | 23 | 18 | 15 | 20.4 | 23 |
| $Nb_2O_5$ | 9 | 10 | 10 | 12 | 11 | 11 | 10.2 | 10 |
| $n_d$ | 1.9684 | 1.9693 | 1.9720 | 1.9771 | 1.9861 | 1.9846 | 2.006 | |
| | 34.1 | 34.2 | 33.7 | 32.4 | 33.5 | 33.9 | 33.2 | |

Each of the glass compositions as indicated in Tables I and II above may be produced in the conventional manner as indicated in Examples 1 and 2 above.

Although the invention has been illustrated and described with reference to the preferred embodiments thereof, it is to be understood that it is in no way limited to the details of such embodiments, but is capable of numerous modifications within the scope of the appended claims.

I claim:

1. A glass composition having a refractive index of at least substantially above 1.9 and a high content in $La_2O_3$, $ThO_2$, and $Ta_2O_5$ and essentially consisting of:

| | Percent by weight |
|---|---|
| $B_2O_3$ | 10–20 |
| $La_2O_3$ | 11–35 |
| $ThO_2$ | 15–50 |
| $Ta_2O_5$ | 5–25 |
| $TiO_2$ | 0–5 |
| CdO | 0–5 |
| $Al_2O_3$ | 0–15 | and having a content in $Nb_2O_5+WO_3+PbO$ of 6 to 27% by weight, in which the content in $Nb_2O_5$ amounts to at least 2% by weight, the aggregate of $TiO_2$ and CdO being about 0–5%, and said $La_2O_3$ being replaceable by up to 5% alkaline earth metal oxide.

2. A composition in accordance with claim 1 in which the content in $La_2O_3+ThO_2$ amounts to 47 to 62% by weight.

3. A glass composition in accordance with claim 1 in which said $Nb_2O$ is present in excess of 6% by weight.

4. A glass composition in accordance with claim 1 in which the same has a refractive index of $n_d$ in excess of 1.962 while having a low dispersion and essentially consisting of:

| | Percent by weight |
|---|---|
| $B_2O_3$ | 10–15 |
| $La_2O_3$ | 11–29 |
| $ThO_2$ | 24–50 |
| $Ta_2O_5$ | 15–25 |
| $Nb_2O_5$ | 9–13 |

References Cited in the file of this patent
UNITED STATES PATENTS

| | | |
|---|---|---|
| 2,434,149 | De Paolis | Jan. 6, 1948 |
| 2,787,554 | De Paolis | Apr. 2, 1957 |
| 2,967,779 | Izumitani | Jan. 10, 1961 |
| 2,971,854 | Geffcken | Feb. 14, 1961 |
| 3,082,101 | Geffcken et al. | Mar. 19, 1963 |

UNITED STATES PATENT OFFICE
CERTIFICATE OF CORRECTION

Patent No. 3,150,990 September 29, 1964

Marga Faulstich

It is hereby certified that error appears in the above numbered patent requiring correction and that the said Letters Patent should read as corrected below.

Column 6, line 7, for "$Nb_2O$" read -- $Nb_2O_5$ --.

Signed and sealed this 19th day of January 1965.

(SEAL)
Attest:

ERNEST W. SWIDER
Attesting Officer

EDWARD J. BRENNER
Commissioner of Patents